(12) United States Patent
Pyattaev et al.

(10) Patent No.: US 9,277,439 B2
(45) Date of Patent: Mar. 1, 2016

(54) DEVICE-TO-DEVICE CONTENTION MANAGEMENT SCHEME FOR MOBILE BROADBAND NETWORKS

(71) Applicant: INTEL CORPORATION, Santa Clara, CA (US)

(72) Inventors: Alexander Pyattaev, Santa Clara, CA (US); Kerstin Johnsson, Palo Alto, CA (US)

(73) Assignee: Intel Corporation, Santa Clara, CA (US)

(*) Notice: Subject to any disclaimer, the term of this patent is extended or adjusted under 35 U.S.C. 154(b) by 236 days.

(21) Appl. No.: 13/931,415

(22) Filed: Jun. 28, 2013

(65) Prior Publication Data
US 2015/0003322 A1 Jan. 1, 2015

(51) Int. Cl.
 H04W 4/00 (2009.01)
 G06F 15/16 (2006.01)
 H04W 28/02 (2009.01)
 H04W 40/16 (2009.01)
 H04W 76/02 (2009.01)
 H04W 28/08 (2009.01)

(52) U.S. Cl.
 CPC .......... *H04W 28/0221* (2013.01); *H04W 28/08* (2013.01); *H04W 40/16* (2013.01); *H04W 76/023* (2013.01)

(58) Field of Classification Search
None
See application file for complete search history.

(56) References Cited

U.S. PATENT DOCUMENTS

| | | | |
|---|---|---|---|
| 2006/0010199 A1* | 1/2006 | Brailean et al. | 709/204 |
| 2010/0009675 A1 | 1/2010 | Wijting et al. | |
| 2010/0261469 A1 | 10/2010 | Ribeiro et al. | |
| 2011/0110229 A1 | 5/2011 | Himayat et al. | |
| 2011/0255479 A1* | 10/2011 | Liu | 370/328 |
| 2011/0258327 A1 | 10/2011 | Phan | |
| 2011/0287794 A1 | 11/2011 | Koskela et al. | |
| 2011/0306349 A1 | 12/2011 | Hakola et al. | |
| 2012/0163160 A1 | 6/2012 | Himayat et al. | |
| 2012/0322484 A1 | 12/2012 | Yu et al. | |
| 2013/0034082 A1 | 2/2013 | Etemad et al. | |
| 2013/0073671 A1* | 3/2013 | Nagpal et al. | 709/217 |
| 2013/0128858 A1 | 5/2013 | Zou et al. | |
| 2014/0242982 A1* | 8/2014 | Yang et al. | 455/434 |

FOREIGN PATENT DOCUMENTS

WO 2011079552 7/2011

* cited by examiner

*Primary Examiner* — Kiet Tang
(74) *Attorney, Agent, or Firm* — Stoel Rives LLP (57) ABSTRACT

Device-to-device (D2D) contention management systems and methods provide managed offloading of cellular network traffic through a contention-based network. For each link in a group of links between nodes in the contention-based network, a link cost is calculated to determine a number of potential links that may interfere with the link, if activated. Each link is evaluated in the order of ascending link cost to determine whether it complies with predefined conditions and whether activating the link increases or decreases D2D network throughput. If the link increases throughput, the link is activated.

20 Claims, 8 Drawing Sheets

DEVICE-TO-DEVICE CONTENTION MANAGEMENT SCHEME FOR MOBILE BROADBAND NETWORKS

TECHNICAL FIELD

Embodiments described herein generally relate to wireless communication systems, and more particularly relate to offloading network traffic through a contention-based network for direct device-to-device communication.

BACKGROUND

In cellular systems, such as networks operating under the Universal Mobile Telecommunications System (UMTS) Long Term Evolution (LTE) standard initiated by the third-generation partnership project (3GPP) or the Institute of Electrical and Electronics Engineers (IEEE) 802.16 standard (WiMax), transmissions may travel via an infrastructure path through a core network. When wireless mobile devices (e.g., user equipments or "UEs") are in proximity to one another, the infrastructure path represents a waste of network channel and user battery resources. To avoid this waste and improve UE and network performance, direct communications protocols are being investigated in 3GPP systems for the purpose of offloading data traffic onto direct links between UEs.

While efforts are being made in 3GPP systems to develop a new LTE-based device-to-device (D2D) protocol, there are many D2D protocols that exist in distributed networks, which can be used to offload network traffic onto direct links. Because such D2D protocols are designed for distributed networks, however, they do not have a central management. Thus, the D2D protocols use contention-based procedures to manage radio resources. Since the contention-based D2D protocols are non-cellular protocols, they reside on bands other than the cellular network and are useful for the purpose of offloading cellular network traffic. Unfortunately, the contention-based D2D protocols do not always perform well with respect to user throughput, delay, and/or battery power.

DESCRIPTION OF EMBODIMENTS

I. Overview

There are various applications and use cases proposed in 3GPP which may involve network initiated or UE initiated communication to or among a group of users and/or devices. For example, D2D or peer-to-peer communications among a group of users and/or devices have been proposed for local social networks, content sharing, location based marketing, serving advertisements, mobile-to-mobile applications, public safety, and other applications.

D2D communications may be implemented using licensed or unlicensed wireless spectrum in a contention-based network. Examples of communication systems that may use unlicensed wireless spectrums include, for example, 802.11 ("WiFi"), Bluetooth, near field communication ("NFC"), and so forth. In various embodiments, mobile devices may utilize WiFi direct or another discovery procedure to discover and establish direct D2D communication links with other mobile devices. If mobile devices move out-of-range from each other during D2D communication, session continuity may be lost.

UEs may initiate communication with each other while remote from each other over a wireless wide area network (WWAN), such as an LTE or WiMax wireless communications network, but then establish direct communication links as they move into proximity of each other. As discussed above, continuing to use WWAN resources to communicate while within proximity of each other may reduce throughput, increase delay, use excessive battery power, and/or may drain WWAN resources that may be put to better use for communications between mobile devices that are remote from each other.

To improve performance, certain embodiments disclose a D2D contention management scheme that improves or maximizes total D2D throughput while complying with a set of predefined conditions (e.g., bounds on user medium access delay and energy consumption). Certain such embodiments perform a cost/benefit analysis of activating each D2D link. The analysis is done in the context of all other existing D2D links and/or a subset of desired D2D links, as well as co-channel background interference. As discussed below, results show that the disclosed embodiments improve the medium access delay and energy efficiency of D2D users while maintaining D2D link throughput.

The cost/benefit analysis determines which existing and/or requested D2D links are given access to the wireless channel. Certain embodiments find a set of D2D links that, when activated simultaneously, maximize throughput while complying with a set of predefined conditions. Based on the set of conditions, the set of D2D links can be parameterized to maximize total network throughput or minimize user delay and battery consumption.

Certain embodiments are similar to graph partitioning of a graph G=(V, E) with V vertices and E edges, except with certain bounds defined by the wireless channel. The graph partitioning problem may have a computation complexity corresponding to NP-complete (similar to a subset-sum problem), where NP refers to nondeterministic polynomial time, and is therefore unsolvable. Thus, an algorithm according to such embodiments may yield suboptimal link selection in real-time.

The algorithm has certain distinctive features, such as being capable of taking into account existing uncontrolled D2D connections. The algorithm can also, for example, operate on incomplete data and scale linearly with network size. In certain embodiments, restrictions can be enforced on select D2D connections to satisfy individual quality of services (QoS) requirements.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

II. WiFi D2D Example

To provide a high-level understanding of the disclosed D2D contention management scheme, a WiFi D2D network example is discussed below. Persons skilled in the art will recognize, however, that other network protocols (e.g., Bluetooth, NFC, etc.) or combinations of network protocols may be used.

Figure 1:
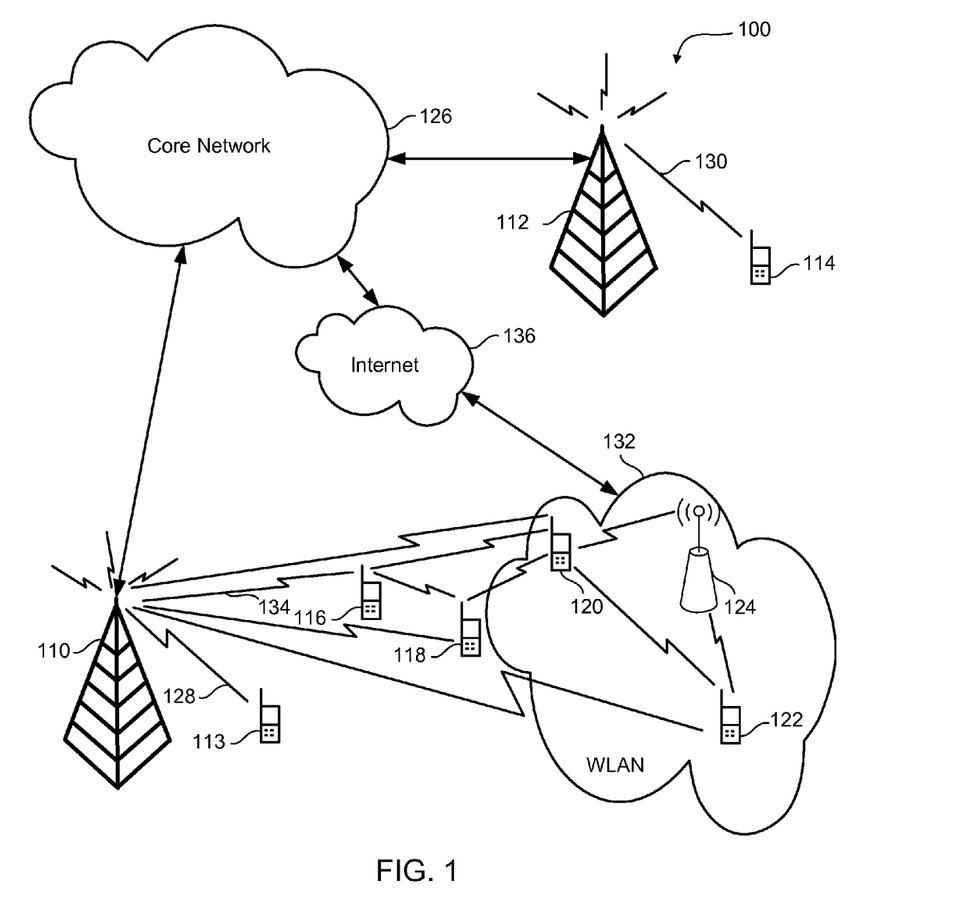
FIG. 1 is a block diagram of an example communication network according to one embodiment.

FIG. 1 is a block diagram of an example communication network 100 according to one embodiment. The example communication network 100 includes a plurality of base stations 110, 112 and a plurality of UEs 113, 114, 116, 118, 120, 122. The term "base station" as used herein is a generic term. As will be appreciated by those skilled in the art, in an Evolved Universal Terrestrial Radio Access Network (EUTRAN), such as one used in the LTE architecture, the base stations 110, 112 may each be an evolved NodeB (eNodeB). However, the term "eNodeB" is also broader in some senses than the conventional base station since the eNodeB refers, in general, to a logical node. The term "base station" as used herein is inclusive of a base station, a NodeB, an eNodeB or other nodes specific for other architectures.

The EUTRAN is a wireless communication network using the air interface defined by the 3GPP's LTE and LTE advanced (LTE-A) standards. EUTRAN is also referred to as the 3GPP work item on the Long Term Evolution and the evolved universal terrestrial radio access (EUTRA) in early drafts of the 3GPP LTE specification. The EUTRAN is a radio access network standard meant to replace the UMTS, high-speed downlink packet access (HSDPA), and high-speed uplink packet access (HSUPA) technologies specified in 3GPP releases 5 and beyond. EUTRAN provides higher data rates, lower latency, and is optimized for packet data.

In the example shown in FIG. 1, the UE 113 communicates through a core network 126 with a remotely located UE 114. The UE 113 is within a cell coverage area of the base station 110 and the UE 114 is within the cell coverage are of the base station 112. The EU 113 uses a dedicated channel 128 to communicate with the base station 110, e.g., by transmitting and/or receiving radio link control (RLC) protocol data unit (PDU) segments and service data unit (SDU) segments. Similarly, the UE 114 uses a dedicated channel 130 to communicate with the base station 112. The base stations 110 and 112 are respectively connected to the core network 126 through radio network controllers (not shown). In the LTE architecture, the core network 126 is an evolved packet core (EPC). The core network 126 may include a plurality of servers (e.g., network operator servers) and gateways (e.g., for accessing the internet 136).

In FIG. 1, the UEs 116, 118, 120, 122 have established an ad-hoc WiFi direct network with corresponding communication links. In such an embodiment, two or more of the UEs 116, 118, 120, 122 may directly communicate with each other without involving central access points. In the example shown in FIG. 1, however, the UEs 120 and 122 are also within a wireless local area network (WLAN) 132 that includes a wireless access point (WAP) 124 configured to communicate using a WiFi protocol. The WAP 124 may, for example, provide one or both of the UEs 120 and 122 with access to the internet 136. One or more of the UEs 116, 118, 120, 122 may also be in communication with at least one base station in the communication network 100. For example, the UE 116 is shown with a dedicated channel 134 to the base station 110.

When within range, the UEs 116, 118, 120, 122 are configured to communicate with each other through D2D links using an ad-hoc contention-based protocol. In FIG. 1, for example, D2D links may be activated between the UE 116 and the UEs 118, 120, between the UE 118 and the UE 120, between the UE 120 and the UE 122, and between the WAP 124 and the UEs 120, 122. In certain embodiments, a server (shown, e.g., in FIG. 10) selects which of the D2D links to activate or deactivate based on a cost/benefit analysis. The server may, for example, be part of the core network 126 and may provide network operator assistance for managing communications between the UEs 116, 118, 120, 122. In other embodiments, the server may be configured to provide cloud-based services through the internet 136 for managing communications between the UEs 116, 118, 120, 122 in the ad-hoc network. In yet other embodiments, one of the UEs 116, 118, 120, 122 and/or the WAP 124 may be configured to manage communications in the ad-hoc network.

Figure 2:
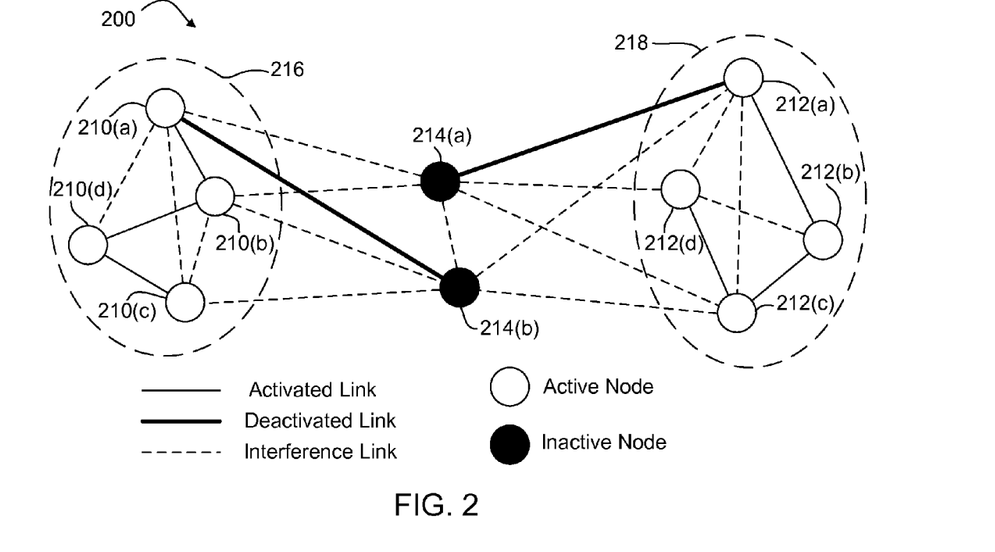
FIG. 2 illustrates a network graph according to an example embodiment.

In certain embodiments, the cost/benefit analysis is performed periodically or whenever trigger conditions are met as the UEs 116, 118, 120, 122 and/or the WAP 124 move locations. The cost/benefit analysis may include representing the UEs as nodes in a network graph. For example, FIG. 2 illustrates a network graph 200 according to an example embodiment. The network graph 200 includes a collection of co-channel WiFi D2D nodes 210, 212, 214 along with their desired D2D links (shown in solid lines) and undesired interference links (shown in dashed lines). Any line (regardless of being desired or undesired) between two nodes indicates that the nodes are within WiFi D2D range. Thus, any two lines that do not have endpoints (nodes) in common, or that are not connected via another line, represent links that can run in parallel (i.e., they do not cause each other interference or collisions).

In FIG. 2, there are eight desired WiFi D2D links (shown in solid lines representing activated and deactivated links). In this example, the activated links can be grouped into two distinct clusters 216, 218. Any link from a given cluster (e.g., cluster 216) has zero potential of colliding with a link from the other cluster (e.g., cluster 218). Thus, to maximize the number of active links without introducing any contention, only one desired link from each cluster is activated (i.e. in FIG. 2, all but one activated link from each cluster is deactivated and the inactive links remain inactive).

However, because total WiFi D2D network throughput initially increases with the number of locally active D2D links (before decreasing due to deleterious contention), it may be desirable to activate all desired links within each cluster simultaneously while leaving the links that cause cross-cluster interference inactive (i.e., as in FIG. 2) to maximize network throughput. This may result in manageable contention and maximum throughput within each cluster 216, 218. Further, because the clusters 216, 218 do not block each other's transmissions, their throughput may be additive. If any of the deactived links are activated, on the other hand, they would end up blocking transmissions from both clusters, which may result in decreased network throughput. Certain embodiments described herein analyze these throughput gains and losses and determine which links to activate simultaneously.

III. Example D2D Contention Management Scheme

Figure 3:
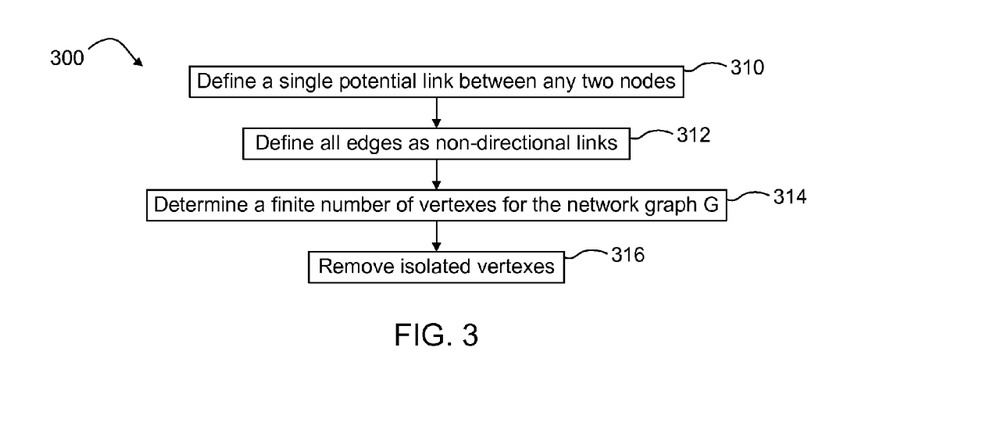
FIG. 3 is a flow diagram illustrating a process for defining a network graph according to one embodiment.

A collection of nodes, their desired D2D links, and their undesired interference links constitute a network graph G, where the vertexes are the nodes and the edges are the links (see FIG. 2). In certain embodiments, the network graph G can take any shape. In other embodiments, however, the shape or definition of the network graph G may include one or more restrictions. For example, FIG. 3 is a flow diagram illustrating a process 300 for defining a network graph G according to one embodiment. The process 300 includes defining 310 a single potential link between any two nodes (i.e., an edge between two vertexes can only have multiplicity of one), defining 312 all edges as non-directional links, determining 314 a finite number of vertexes for the network graph G, and removing 316 isolated vertexes (e.g., from the network point of view, isolated vertexes have no partner and therefore are of no interest).

Figure 4:
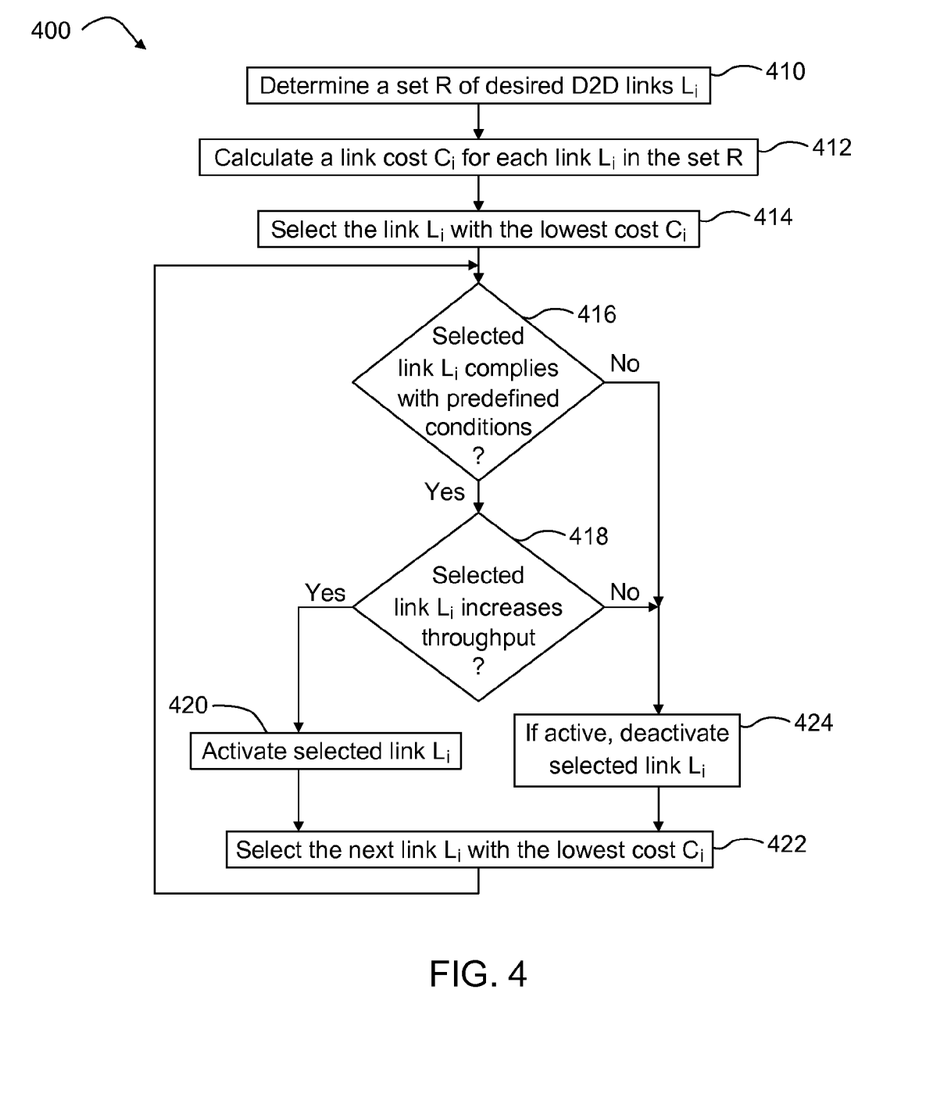
FIG. 4 is a flow diagram illustrating a process for D2D contention management according to one embodiment.

FIG. 4 is a flow diagram illustrating a process 400 for D2D contention management according to one embodiment. The process 400 increases or maximizes D2D network throughput while complying with a set of predefined conditions. The predefined conditions may include, for example, a jitter requirement, a delay requirement, a UE energy consumption requirement, a throughput requirement, other quality of service (QoS) requirements, and combinations of the foregoing. In one embodiment, for example, a potential link is determined to meet a minimum threshold value before being considered for activation. D2D network throughput is the sum throughput of all active D2D links, where the throughput of a given link $L_i$ is defined as $T_i=1/N_i$ and $N_i$=number of active D2D links that interfere with it.

The process 400 determines 410 a set R of desired D2D links $L_i$, which is composed of both existing D2D links (which could be continued or ended) as well as requested D2D links. Given the set R of desired D2D links, the process 400 attempts to activate a group of links from the set R that results in the largest sum throughput when activated simultaneously. In many cases, the set R is a subset of all the links in the network graph G. In certain embodiments, no links outside of the set R are allowed to be activated, and no links in the set R are required to be activated. Additionally, as discussed below, a set Z of unmanaged, always active rogue links may also be specified. The set Z of unmanaged rogue links may, for example, include links between nodes in the ad-hoc network that do not have the ability to communicate with the core network 126 (e.g., nodes that are not associated with the cellular network operator).

The process 400 calculates 412 a cost $C_i$ of every link $L_i$ in the set R based on the potential number of links that the particular link $L_i$ may interfere with, if activated. Each link is then evaluated in the order of ascending cost to determine whether it complies with the predefined conditions and whether activating it will increase or decrease D2D network throughput. If it will increase throughput, it is activated, otherwise it is not considered for activation until the algorithm is run again.

As shown in FIG. 4, the process 400 selects 414 the link $L_i$ with the lowest cost $C_i$, and queries 416 whether the selected link $L_i$ complies with the predefined conditions. If the selected link $L_i$ complies with the predefined conditions, the process 400 queries 418 whether the selected link $L_i$ increases throughput. If the selected link $L_i$ increases throughput, the process 400 activates 420 the selected link $L_i$ (or maintains an already active link in the active state), and selects 422 the next link $L_i$ with the lowest cost $C_i$. If, on the other hand, the selected link $L_i$ does not comply with the predefined conditions or does not increase throughput, then the process 400 deactivates 424 the selected link $L_i$ (if already active) before selecting the next link $L_i$ with the lowest cost $C_i$. After selecting the next link $L_i$ with the lowest cost $C_i$, the process 400 repeats the process of querying 416, 418 and activating 420 or deactivating 424 the newly selected link $L_i$ with the lowest cost.

Figure 5:
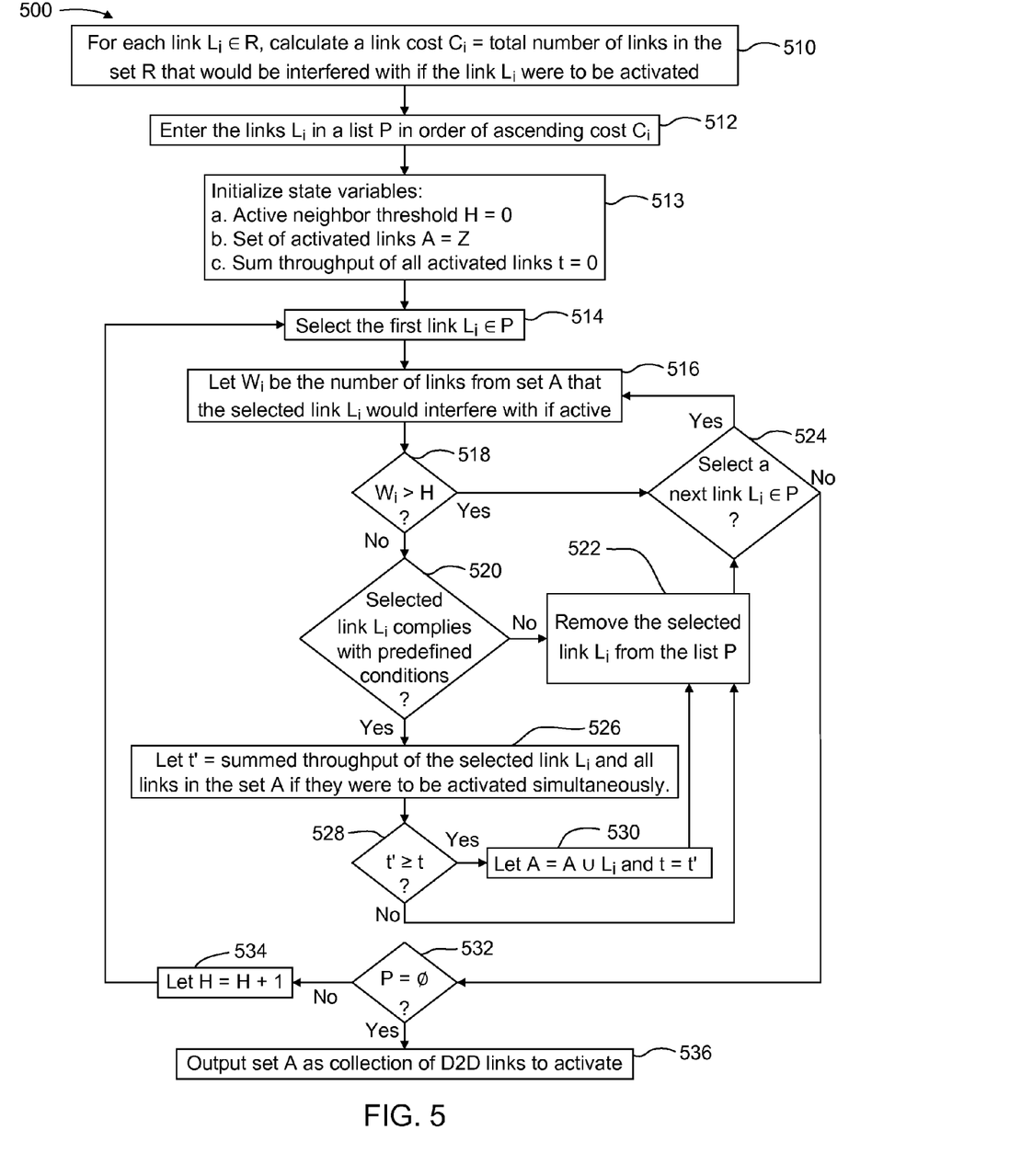
FIG. 5 is a flow diagram illustrating a process for D2D contention management according to another embodiment.

FIG. 5 is a flow diagram illustrating a process 500 for D2D contention management according to one embodiment. As discussed above with respect to FIG. 4, the process 500 determines a set R of desired D2D links $L_i$. In addition the process 500 determines a set Z of rogue D2D links. For each link $L_i \epsilon R$ (each link $L_i$ in the set R), the process 500 calculates 510 a link cost $C_i$=total number of links in R that would be interfered with if $L_i$ were to be activated. These are links from the set R for which at least one endpoint (i.e., vertex) is the same as or adjacent to any of $L_i$'s endpoints (where adjacency is defined by the edges in network graph G). Two vertexes are "adjacent" if there is an edge between them.

The process 500 also includes entering 512 all links $L_i$ into a list P in order of ascending cost, and initializing 513 the following state variables: active neighbor threshold H=0; a set A of activated links=the set Z of unmanaged, always active rogue links; and a sum throughput of all activated links t=0. The active neighbor threshold H is an incrementable variable to account for the active rogue links in the set Z and any other previously activated links in the set A.

The process 500 also includes a subprocess comprising selecting 514 the first link $L_i \epsilon P$, letting 516 a variable $W_i$ be the number of links from set A that the selected link $L_i$ would interfere with if active, and determining 516 whether $W_i > H$. If $W_i > H$, then the subprocess includes querying 524 whether to select a next link $L_i \epsilon P$. If there exists a next link $L_i \epsilon P$ (e.g., with the next lowest link cost $C_i$), then the subprocess selects the next link $L_i \epsilon P$ for processing using the subprocess (e.g., letting 516 the variable $W_i$ be the number of links from set A that the next selected link $L_i$ would interfere with if active). For purposes of discussion, once a next link is selected, reference to the selected link $L_i$ in the process 500 refers to the current or next selected link.

If the variable $W_i$ is less than or equal to the active neighbor threshold H, the subprocess includes querying 520 whether the selected link $L_i$ complies with predefined conditions, as discussed above. If the selected link $L_i$, does not comply with the predefined conditions, the subprocess includes removing 522 the selected link $L_i$ from the list P and, if applicable, selects a next link $L_i \epsilon P$ for processing using the subprocess. If, however, the selected link $L_i$, complies with the predefined conditions, the subprocess includes letting 526 a next sum throughput t'=summed throughput of the selected link $L_i$ and all links in the set A if they were to be activated simultaneously, and querying 528 whether t'≥t.

If the next sum throughput t' is less than the previous sum throughput t, then the subprocess includes removing 522 the selected link $L_i$ from the list P before selecting a next link $L_i \epsilon P$ for processing using the subprocess. If, however, t'≥t, the subprocess includes letting 530 A=A∪$L_i$ and t=t' before removing 522 the selected link $L_i$ from the list P and selecting, if applicable, a next link $L_i \epsilon P$ for processing using the subprocess.

If querying 524 whether to select a next link $L_i \epsilon P$ results in determining that there does not exists a next link $L_i \epsilon P$ that has not already been processed for the current value of the active neighbor threshold H, then the subprocess includes querying 532 whether P=∅, where ∅ is the empty set (e.g., the list P includes links that have been previously processed for a previous value of H but have not been removed from the list P so as to allow subsequent processing for one or more other H values). If P≠∅ the subprocess includes letting 534 H=H+1 and repeating the subprocess for the links remaining in the list P. If, however, P=∅, then the process includes outputting 536 the set A as the collection of D2D links to activate.

In certain embodiments, the subprocess may be summarized as follows:

Starting with the first link $L_i \epsilon P$:
Let $W_i$ be the number of links from set A that $L_i$ would interfere with were it activated;
if $W_i$>H then go to the next link $L_i$ in the list P and let $W_i$ be the number of links from set A that this link would interfere with were it activated;
if any predefined condition is not met, then remove $L_i$ from the list P and go to the next link $L_i$ in the list P and let $W_i$ be the number of links from set A that this link would interfere with were it activated;
let t'=summed throughput of the link $L_i$ and all links in the set A if they were to be activated simultaneously;
if t'≥t, then let
A=A∪$L_i$, (where ∪ represents a union), and
t=t';
remove the link $L_i$ from the list P and go to the next link $L_i$ in the list P;
if P≠∅ (where ∅ is an empty set), then let H=H+1 and repeat the process.

The set A is the collection of D2D links activated. Their sum throughput=t. The method is stable, and its overall complexity is O(L·average vertex rank) for the cost estimation stage and O(L·R) for the link activation stage.

IV. Example Performance Results

By way of illustration, an example embodiment was tested in a wrap-around environment of size 500 m×500 m with up to sixty (60) D2D source nodes. A source node is a node with traffic to send. The propagation environment in this example is urban with no line of sight, and antenna height is assumed to be 1.5 m. D2D source nodes are deployed randomly but uniformly across the environment. Each source in this example is given exactly one destination node, which is picked randomly from all the nodes within D2D range. To ensure pairing for all sources, a sufficiently large number of potential destination nodes are dropped in the environment. Note that other source nodes can be selected as destinations as well.

The media access control (MAC) protocol used in this example is IEEE 802.11-2012 with request-to-send/clear-to-send (RTS-CTS) enabled. This example embodiment does not use multiple-input and multiple output (MIMO), and the clear channel assessment function has a threshold of about −76 dBm. System noise floor in this example is chosen to be about −100 dBm. The traffic pattern is saturated queue with maximum transmission opportunity size of about 1300 ms.

A goal of this example embodiment is to minimize user MAC delay and energy consumption while maximizing total network throughput. Thus, the algorithm may be run under the following predefined condition: no active link can contend with (i.e., block) another active link.

Figure 6:
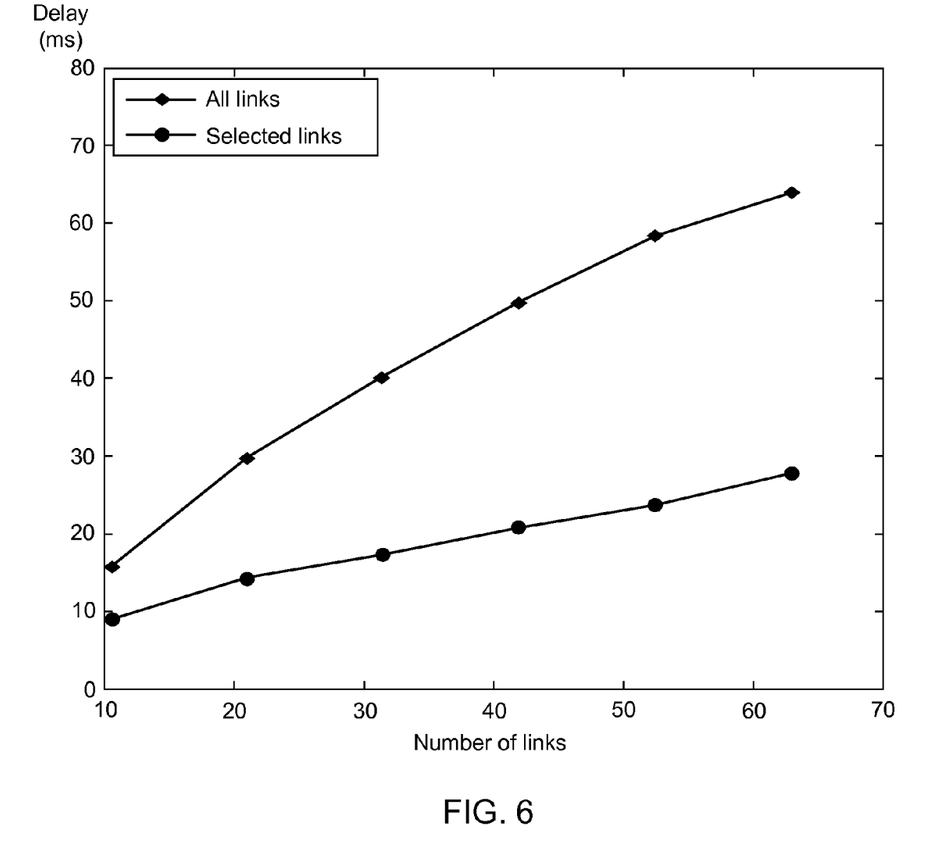
FIG. 6 is a graph illustrating delay versus the number of potential D2D links according to an example embodiment.

FIG. 6 is a graph illustrating delay versus the number of potential D2D links according to the example embodiment. As FIG. 6 shows, the performance improvement in average user MAC delay from network management grows with the number of potential D2D links, but it is significant at all numbers of D2D links. For example, when there are sixty (60) D2D links in the deployment, this example embodiment reduces average user MAC delay by more than half. But even at low D2D link numbers (e.g., about 10 links), average MAC delay is reduced by over a third.

Figure 7:
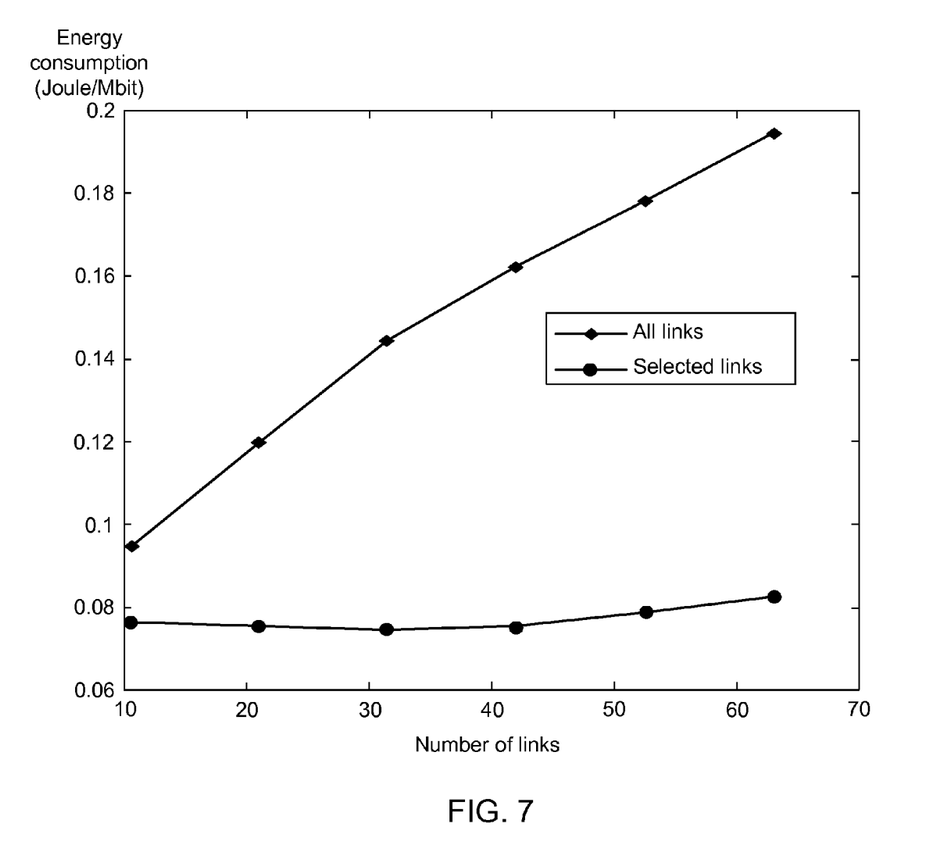
FIG. 7 is a graph illustrating energy consumption versus the number of potential links according to the example embodiment.

FIG. 7 is a graph illustrating energy consumption versus the number of potential links according to the example embodiment. FIG. 7 shows that with sixty (60) potential D2D links in the deployment, the average user energy consumption when all links are activated is almost 0.2 joules/Mbit. By comparison, when only selected links are activated according to the disclosed embodiments, this value decreases to just over 0.08 joules/Mbit. This is a reduction in average energy consumption of almost 60%.

Figure 8:
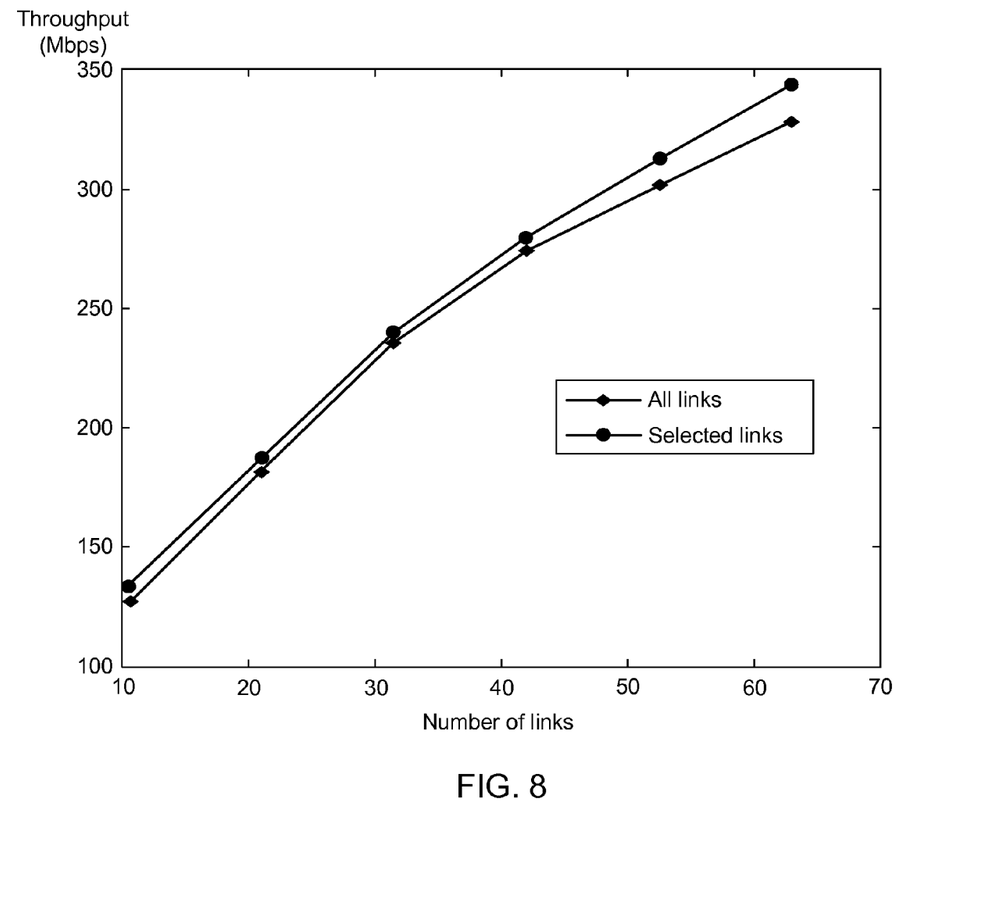
FIG. 8 is a graph illustrating throughput versus the number of links according to the example embodiment.

These delay and energy improvements are useful because, at least in part, the example embodiment maintains (and improves) total D2D network throughput at the same time. For example, FIG. 8 is a graph illustrating throughput versus the number of links according to the example embodiment. FIG. 8 shows that when the example embodiment activates a subset of D2D links (in lieu of all of them) in an effort to reduce average user MAC delay and energy consumption, the example embodiment actually increases overall D2D network throughput. Thus, the embodiments disclosed herein can achieve significant improvements in delay and energy without sacrificing network throughput.

V. Example Devices

Figure 9:
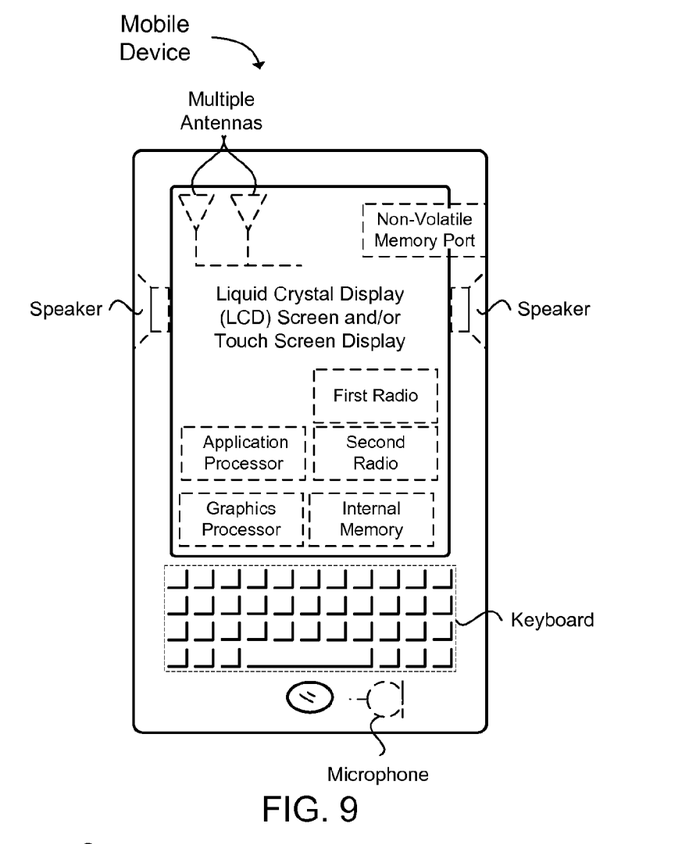
FIG. 9 provides an example illustration of a mobile device, such as a user equipment (UE) according to one embodiment.

FIG. 9 provides an example illustration of a mobile device, such as a user equipment (UE), a mobile station (MS), a mobile wireless device, a mobile communication device, a tablet, a handset, or other type of mobile wireless device. The mobile device can include one or more antennas configured to communicate with a transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard including 3GPP LTE, LTE-A, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 9 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

In one embodiment, the mobile device shown in FIG. 1 includes a UE with a first radio to communicate with an evolved Node B (eNB) in a third generation partnership project (3GPP) long term evolution (LTE) or LTE advanced (LTE-A) network, a second radio to communicate with wireless devices in an ad-hoc network through respective communication paths, and a processor. The processor is configured to measure interference that each of the communication paths adds to the ad-hoc network. The process is also configured to transmit, through the first radio to an operator system, an indication of each of the communication paths and its corresponding interference. The processor is also configured to selectively communicate with the wireless devices in the ad-hoc network using the communication paths based on instructions received through the first network from the operator system.

In certain such embodiments, wherein to measure the interference that a particular communication path adds to the ad-hoc network, the processor is further configured to activate the particular communication path, and determine a number of other active communication paths in the ad-hoc network with which the particular communication path interferes. The processor may also determine a throughput of the particular communication path as an inverse of the number of other active communication paths in the ad-hoc network with which the particular communication path interferes. The processor may also transmit, through the first radio to the operator system, the throughput of the particular communication path.

In addition or in other embodiments, the processor is further configured to measure a predefined condition selected from a group comprising jitter, delay, UE energy consumption, throughput, and quality of service (QoS). The processor in such embodiments may also transmit, through the first radio to the operator system, the measured predefined condition.

In addition or in other embodiments, the UE includes at least a first antenna configured to transmit and receive first wireless signals through the first radio, and at least a second configured to transmit and receive second wireless signals through the second radio.

Figure 10:
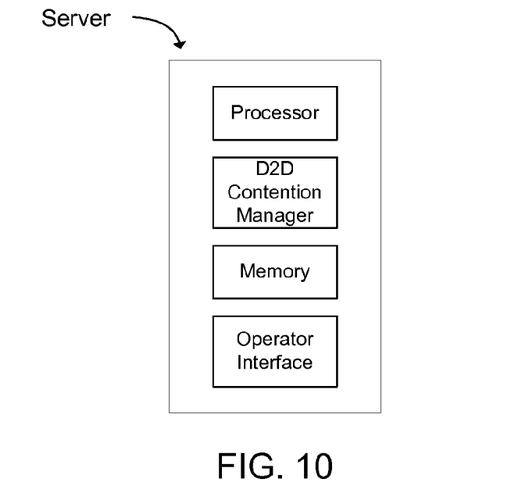
FIG. 10 is a simplified block diagram of a server configured for managing network traffic according to one embodiment.

FIG. 10 is a simplified block diagram of a server configured for managing network traffic according to one embodiment. The network traffic may, for example, be offloaded from a wireless cellular network to a device-to-device (D2D) contention-based network. The server includes a processor and a D2D contention manager. The D2D contention manager includes instructions that, when executed by the processor, manage communications between user equipments (UEs) in the D2D contention-based network. At least two of the UEs may be configured to selectively communicate with each other through a core network of the wireless cellular network and through the D2D contention-based network. The D2D contention manager is configured to define a first set of links in the D2D contention-based network, and for each link in the first set, calculate a link cost corresponding to the number of other links in the first set that it conflicts/contends with. The D2D contention manager is also configured to, in order of ascending link cost, evaluate each link in the first set to select a second set of links from among the first set that, when activated, increases a sum throughput of data packets communicated between the UEs. The D2D contention manager is also configured to communicate a message to the UEs to activate the second set of links.

In certain such embodiments, the second set of links, when activated, satisfies one or more predefined performance condition associated with the UEs communicating through the core network.

In one embodiment, the server is configured to operate in the core network of the wireless cellular network. The server, for example, may further include a network operator interface to provide network operator assistance in establishing at least one of the links in the second set. In another embodiment, the server is configured to provide a cloud-based service for managing communications between the UEs in the D2D contention-based network.

In certain embodiments, the D2D contention manager is configured to define the first set of links by modeling the UEs in the D2D contention-based network in a network graph with a single potential link between any two of the UEs. Vertexes of the network graph represent the UEs. The D2D contention manager may be configured to define the edges in the network graph as non-directional links, determine a finite number of vertexes for the network graph, and remove isolated vertexes from the network graph.

In certain embodiments of the server, the link cost for a link "$L_i$" in the first set comprises a total number of links in the first set that are interfered with, if the link $L_1$ is activated. To evaluate each link in the first set to select the second set, the D2D contention manager is configured to enter the links in the first set into a list "P" in order of ascending link cost. It then creates a set "A" of all activated links and initializes it to a set "Z", where set Z includes active rogue links between unmanaged nodes in the D2D contention-based network. The D2D contention manager is further configured to initialize an active neighbor threshold "H" to a first preset value. The active neighbor threshold H includes an incrementable variable to account for the active rogue links in the set Z and any other previously activated links in the set A. The D2D contention manager is further configured to set an initial sum throughput "t" to a second preset value.

The techniques introduced above can be implemented by programmable circuitry programmed or configured by software and/or firmware, or they can be implemented entirely by special-purpose hardwired circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced herein may be stored on a machine-readable storage medium and may be executed by one or more general-purpose or special-purpose programmable microprocessors. A "machine-readable medium," as the term is used herein, includes any mechanism that can store information in a form that is accessible by a machine (a machine may be, for example, a computer, network device, cellular phone, PDA, manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic," as used herein, can include, for example, special-purpose hardwired circuitry, software and/or firmware in conjunction with programmable circuitry, or a combination thereof.

It will be understood by those having skill in the art that many changes may be made to the details of the above-described embodiments without departing from the underlying principles of the invention. The scope of the present invention should, therefore, be determined only by the following claims.

The invention claimed is:

1. A server for managing network traffic offloaded from a wireless cellular network to a device-to-device (D2D) contention-based network, the server comprising:
 a processor; and
 memory storing instructions that, when executed by the processor, cause the server to manage communications between user equipments (UEs) in the D2D contention-based network, at least two of the UEs configured to selectively communicate with each other through a core network of the wireless cellular network and through the D2D contention-based network, wherein the instructions cause the server to:
  define a first set of links in the D2D contention-based network;
  for each link in the first set, calculate a link cost corresponding to a conflict with one or more other links in the first set, wherein the link cost for each link is based on a total number of links in the first set with which each link would interfere if activated;
  in order of ascending link cost, evaluate each link in the first set to select a second set of links from among the first set that, when activated, increases a sum throughput of data packets communicated between the UEs; and
  communicate a message to the UEs to activate the second set of links during an offload period.

2. The server of claim 1, wherein the second set of links, when activated, satisfy one or more predefined performance condition associated with the UEs communicating through the core network.

3. The server of claim 2, wherein the one or more predefined performance condition comprises at least one parameter selected from a group comprising jitter, delay, UE energy consumption, throughput, and quality of service (QoS).

4. The server of claim 1, wherein the server is configured to operate in the core network of the wireless cellular network, the server further comprising a network operator interface to provide network operator assistance in establishing at least one of the links in the second set.

5. The server of claim 1, wherein the server is configured to provide a cloud-based service for managing communications between the UEs in the D2D contention-based network.

6. The server of claim 1, wherein the instructions cause the server to represent the first set of links as a network graph, wherein vertexes of the network graph represent UE endpoints of the first set of links in the D2D contention-based network and edges of the network graph represent links, wherein there is only a single potential link between any two UEs, and wherein the instructions cause the server to:
 define the edges in the network graph as non-directional links;
 determine a finite number of vertexes for the network graph; and
 remove isolated vertexes from the network graph.

7. The server of claim 1, wherein the link cost for a first link "$L_i$" in the first set comprises a total number of links in the first set that are interfered with, if the first link $L_i$ is activated.

8. The server of claim 7, wherein to evaluate each link in the first set to select the second set, the instructions cause the server to:
 enter the links in the first set into a list "P" in order of ascending link cost;
 initialize a set "A" of activated links to a set "Z" comprising active rogue links between unmanaged nodes in the D2D contention-based network;
 initialize an active neighbor threshold "H" to a first preset value, the active neighbor threshold H comprising an incrementable variable to account for the active rogue links in the set Z and any other previously activated links in the set A; and
 set an initial sum throughput "t" to a second preset value.

9. The server of claim 8, wherein the instructions further cause the server to perform a subprocess comprising:
 determining a number of links "$W_i$" from the set A that the first link $L_i$ interferes with, when activated;
 if the number of links $W_i$ is less than the active neighbor threshold H, and if predefined performance conditions associated with the UEs are satisfied when the first link $L_i$ is active, then:
  setting a next summed throughput "t'" equal to a sum of the throughput of the first link $L_i$ and a throughput of the activated links in the set A;
  if the next summed throughput t' is greater than or equal to the initial summed throughput t, then adding the first link $L_i$ to the set A of activated links and setting t=t'; and
  removing the first link $L_i$ from the list P and selecting a next link $L_{i+1}$ in the list P to evaluate according to the subprocess;
 if the number of links $W_i$ is greater than the active neighbor threshold H, then selecting the next link $L_{i+1}$ in the list P to evaluate according to the subprocess; and
 if the predefined performance condition associated with the UEs is not satisfied when the first link $L_i$ is active, then removing the first link $L_i$ from the list P and selecting the next link $L_{i+1}$ in the list P to evaluate according to the subprocess.

10. The server of claim 9, wherein the instructions further cause the server to:
 increment the active neighbor threshold H such that H=H+1;
 if the list P≠Ø, where Ø is an empty set, then repeat the subprocess for remaining links in the list P; and
 if the list P=Ø, then select the set A as the second set of links to activate during the offload period.

11. A user equipment (UE), comprising:
 a first radio to communicate with an evolved Node B (eNB) in a third generation partnership project (3GPP) long term evolution (LTE) or LTE advanced (LTE-A) network;
 a second radio to communicate with wireless devices in an ad-hoc network through respective communication paths;
 a processor; and memory storing instructions that, when executed by the processor, cause the UE to:
- activate a particular communication path;
- determine a number of other active communication paths in the ad-hoc network with which the particular communication path interferes in response to activating the particular communication path;
- measure interference that each of the communication paths adds to the ad-hoc network based on the determined number of other active communication paths in the ad-hoc network with which the particular communication path interferes;
- transmit, through the first radio to an operator system, an indication of each of the communication paths and its corresponding interference; and
- selectively communicate with the wireless devices in the ad-hoc network using the communication paths based on instructions received through the first network from the operator system.

12. The UE of claim 11, wherein the memory further stores instructions that further cause the UE to:
- determine a throughput of the particular communication path as an inverse of the number of other active communication paths in the ad-hoc network with which the particular communication path interferes.

13. The UE of claim 12, wherein the memory further stores instructions that further cause the UE to:
- transmit, through the first radio to the operator system, the throughput of the particular communication path.

14. The UE of claim 11, wherein the memory further stores instructions that further cause the UE to:
- measure a predefined condition selected from a group comprising jitter, delay, UE energy consumption, throughput, and quality of service (QoS); and
- transmit, through the first radio to the operator system, the measured predefined condition.

15. The UE of claim 11, further comprising:
- a plurality of antennas, at least a first antenna of the plurality of antennas configured to transmit and receive first wireless signals through the first radio, and at least a second antenna of the plurality of antennas configured to transmit and receive second wireless signals through the second radio; and
- one or more component selected from a group comprising a touch sensitive display screen, a speaker, a microphone, a graphics processor, an application processor, an internal memory, and a non-volatile memory port.

16. A method for wireless communication, the method comprising:
- determining that establishing a first wireless connection between a first node and a second node in a first wireless network interferes with a number of second wireless connections within the first wireless network, wherein the first wireless connection and the second wireless connections comprise direct wireless connections between respective nodes and wherein one or more of the second wireless connections comprise active connections between unmanaged nodes in the first wireless network;
- determining that the number of second wireless connections interfered with by the first wireless connection is below a threshold value;
- determining that directly establishing the first wireless connection increases an amount of data per unit time transmitted through the first wireless network; and
- in response to the determinations, providing access to a communication channel in a second wireless network through the first wireless connection.

17. The method of claim 16, further comprising:
- determining, before providing the access to the communication channel, that communication through the first wireless connection satisfies a predefined condition.

18. The method of claim 17, wherein the predefined condition is selected from a group comprising jitter, delay, UE energy consumption, throughput, and quality of service (QoS).

19. The method of claim 16, wherein the first wireless network comprises a contention-based network, and wherein the second wireless network comprises a cellular communication network.

20. The method of claim 19, wherein the cellular network comprises a third generation partnership project (3GPP) long term evolution (LTE) or LTE advanced (LTE-A) network.

* * * * *